INVENTOR
JAMES L. BOGGS
BY Louis A Kline
Elmer J Wargo
HIS ATTORNEYS

MEANS FOR ADJUSTABLY CONTROLLING THE WIDTH OF A GUIDEWAY

Filed Oct. 14, 1966 2 Sheets-Sheet 2

INVENTOR
JAMES L. BOGGS
BY Louis A Kline
Elmer Wargo
HIS ATTORNEYS

United States Patent Office 3,389,905
Patented June 25, 1968

3,389,905

MEANS FOR ADJUSTABLY CONTROLLING THE WIDTH OF A GUIDEWAY

James L. Boggs, Covington, Ohio, assignor to The National Cash Register Company, Dayton, Ohio, a corporation of Maryland Filed Oct. 14, 1966, Ser. No. 586,766
3 Claims. (Cl. 271—59)

ABSTRACT OF THE DISCLOSURE

A guideway having a fixed wall and a movable wall. The width of the guideway is established in accordance with the width of an object passing therethrough. Once the width of the guideway is so established, the movable wall is fixed by a locking member having adjustable stops thereon. The movable wall is actually one link of a four-link parallel motion mechanism.

The invention described herein was made in the course of performing a United States Government contract with the Department of the Army.

This invention relates to a means for adjustably controlling the width of a guideway in accordance with the width of the object passing therethrough, so that the object may pass through the guideway with a minimum of skewing therein.

One of the problems encountered in manually-operated punched card readers which have the reading station located in a throat passage through which the card being read is moved is that the card has a tendency to skew as it is moved past the reading station, thereby introducing errors in the reading thereof. This is especially troublesome with a compact reader in which the length of the throat passage is short when compared to the length of the card being moved therethrough. If the width of the throat passage is fixed to the average width of a card expected to be read, those cards which have widths less than average will skew extensively when moved past the reading station, and those cards which have widths greater than average will bind or buckle in the passage. If the throat passage has one fixed wall and one movable wall controlling the width of the passage, with the movable wall being resiliently urged towards the fixed wall, skewing will still result as the card is moved through the throat passage unless the card is moved through absolutely parallel to the fixed wall. Because the movable wall is only resiliently held in place, it may be pushed away from the fixed wall by a card which is not moved parallel to the fixed wall, and skewing of the card, with incorrect reading thereof, results.

This invention obviates the problems enumerated in the previous paragraph by providing a means for adjustably fixing the width of a passage opening to a size which is dependent upon the width of the particular object being inserted therein. In applicant's invention, the throat passage, or guideway, is composed of a base and a fixed wall upstanding therefrom. Opposite to the fixed wall is a planar member or wall which is mounted on said base for parallel movement towards and away from the fixed wall. Resilient means are provided to urge the movable planar member towards the fixed wall, and, as the object to be guided through the passage is inserted therein, the movable wall is moved away from the fixed wall by the object until the width of the passage (as measured between the fixed and movable walls) equals the width of the object being inserted therein. With the width of the passage determined in accordance with the width of the object being inserted therein, locking means provided in the invention are then actuated to restrain the movable wall against movement away from the fixed wall, thereby preventing skewing of the object as it passes through the throat passage.

Accordingly, an object of this invention is to provide a means for adjustably controlling and fixing the width of a guideway or passage in accordance with the width of the object being inserted therein.

Another object of this invention is to provide an economical means for adjustably fixing the width of a throat passage in a manually-operated card reader in accordance with the width of the card being inserted therein, so as to minimize skewing of the card as it is moved past a reading station located in the throat passage of the card reader.

These and other objects and advantages will be more fully described in the following description and drawings, in which.

Figure 1:
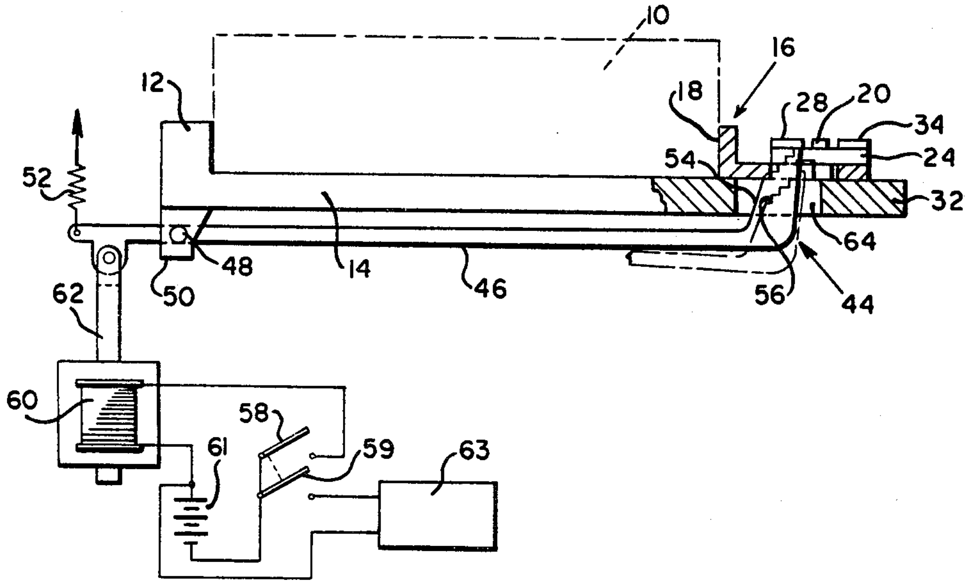
FIG. 1 is an elevational view showing an object positioned in the guideway, with details of the movable wall and locking means of this invention being shown in a reduced, cross-sectional portion which is taken along line 1—1 of FIG. 2.

FIG. 1 shows a general application of the means for adjustably controlling the width of a guideway in accordance with the width of an object 10 being inserted therethrough. The width of the guideway as measured between the wall 12 (fixed to the planar base 14) and the movable wall 16 is set in accordance with the width of the object 10 as it is inserted in the guideway.

Figure 2:
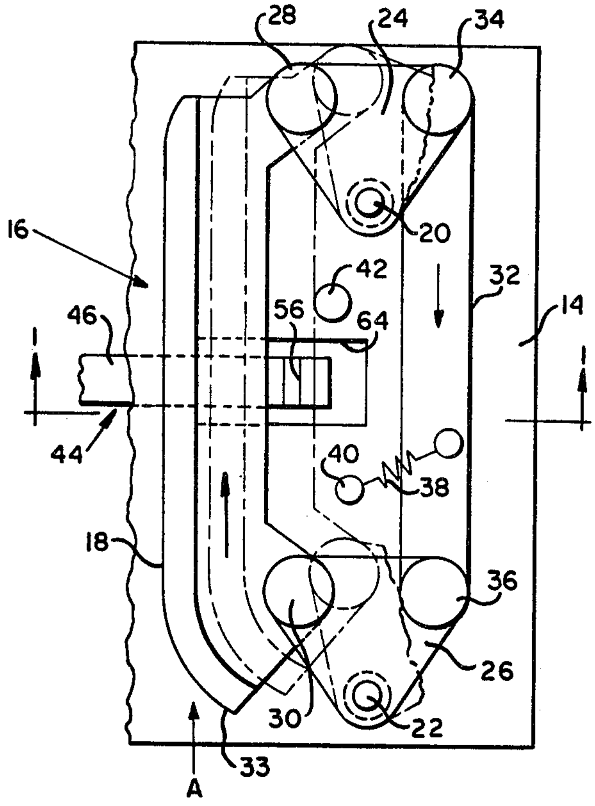
FIG. 2 is an enlarged plan view of the details of the movable wall and locking means shown in FIG. 1.

The wall 16 is movably mounted on the base 14 for parallel movement towards and away from the fixed wall 12, as shown in FIGS. 1 and 2. The wall 16 includes a planar bar member 18, which forms a first link of a four-link, parallel motion mechanism. The second link of the mechanism is actually that portion of the base 14 which extends between the mounting pins 20, 22 (FIG. 2). The remaining two links of the mechanism are formed by triangular links 24 and 26, which are pivotally mounted on the pins 20 and 22, respectively. The bar 18 is pivotally joined at its ends to the links 24 and 26 by mounting pins 28 and 30, respectively, and is parallel at all times to the line joining the centers of the pins 20 and 22. The length of the link 24 as measured by the distance between the centers of the mounting pins 28 and 20 is equal to the length of the link 26 as measured by the distance between the centers of the mounting pins 30 and 22. The line joining the centers of the pins 28 and 20, and the line joining the centers of the pins 30 and 22, are parallel to each other at all times.

Also included in the movable wall 16 is a second bar, 32, whose ends are pivotally joined to the triangular links 24 and 26 by mounting pins 34 and 36, respectively. The distances between the centers of the pins 20 and 34, and the pins 22 and 36, are equal to each other and to the distance between the centers of the pins 20 and 28. The distance between the centers of the pins 34 and 36 is similarly equal to the distance between centers of the pins 28 and 30, so that the bar 32 has the same parallel motion relative to the fixed wall 12 as does the bar 18. A tension spring 38, having one end secured to a pin 40 on the base 14 and the other end secured to the bar 32, is used to resiliently urge the movable wall 16 towards the fixed wall 12. Movement is limited in this direction by the bar 32 abutting against the pin 40. Movement of the movable wall 16 is limited in the opposite direction by the bar 18 (shown in dashed outline) abutting against a pin 42, which is secured to the base 14. With this construction, the bar 18 is kept parallel to the fixed wall 12 as the bar 18 is moved towards and away from the wall 12.

A locking means 44, including a locking lever 46, is provided for restraining movement of the bar 18, and thereby restraining movement of the movable wall 16. The locking lever 46, in one embodiment of the locking means 44, is pivotally mounted on a pin 48 supported in a bracket 50 (FIG. 1), which is secured to the underside of the base 14. A spring 52, secured to one end of the lever 46, is used to urge the opposite end 54 to the dashed-outline position shown in FIG. 1, in which a plurality of stepped abutment stops 56 of the lever 46 are out of engagement with the bar 18.

When an object 10 is inserted in the guideway in the direction A (FIG. 2), its left side, as viewed in FIG. 1, slides against the fixed wall 12, and the front right side of the object engages the curved portion 33 (FIG. 2) of the bar 18 to push said bar away from the fixed wall 12. The locking means 44, including the locking lever 46, is disengaged from the bar 18 at this time and assumes the position shown in dashed outline in FIG. 1, enabling the front of the object to push the bar 18 away from the fixed wall 12, thereby determining the width of the guideway in conformance with the width of the object 10 being inserted therein. With the width of the guideway determined, the bar 18 is ready to be locked in position to prevent the object 10 from skewing in the guideway as the remainder of the object is moved between the fixed wall 12 and the bar 18.

After the object is initially positioned between the fixed wall 12 and the bar 18, the locking means 44 is actuated to restrain the bar 18, as previously mentioned.

The locking means 44 shown in the embodiment of FIG. 1 is actuated by closing a switch arm 58, which energizes a solenoid 60, whose actuating arm 62 pulls the left end of the lever 46 downwardly (as viewed in FIG. 1) to pivot the lever 46 counter-clockwise to bring the pertaining one of the abutment stops 56 into engagement with the bar 18. In place of the solenoid 60, mechanically-operated linkage may be used. The end 54 of the locking lever 46 passes through a slot 64 in the base 14 until one of the stops 56 engages the bar 18. The particular stop 56 engaged depends upon the extent to which the bar 18 is moved away from the fixed wall 12, which, of course, is determined by the width of the object 10 placed therebetween. With one of the stops engaging the bar 18, the object 10 may be moved through the guideway with a minimum of skewing. The remaining switch arm 59 (which may be operatively connected to the switch arm 58) is used to complete a circuit from a voltage source 61 to a utilization device 63, which may be a card punch, a printer, and the like with which the invention may be used.

Figure 3:
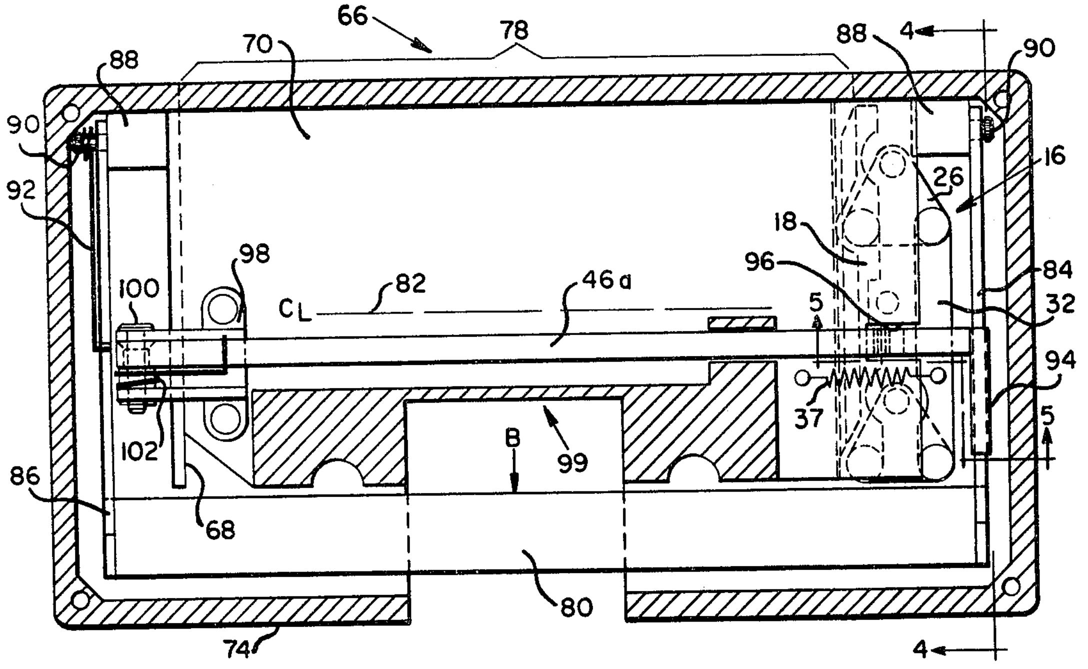
FIG. 3 is a cross-sectional view taken along line 3—3 of FIG. 4, showing a manually-operated card reader and the means for adjustably controlling the width of the throat passage thereof.
Figures 4, 5:
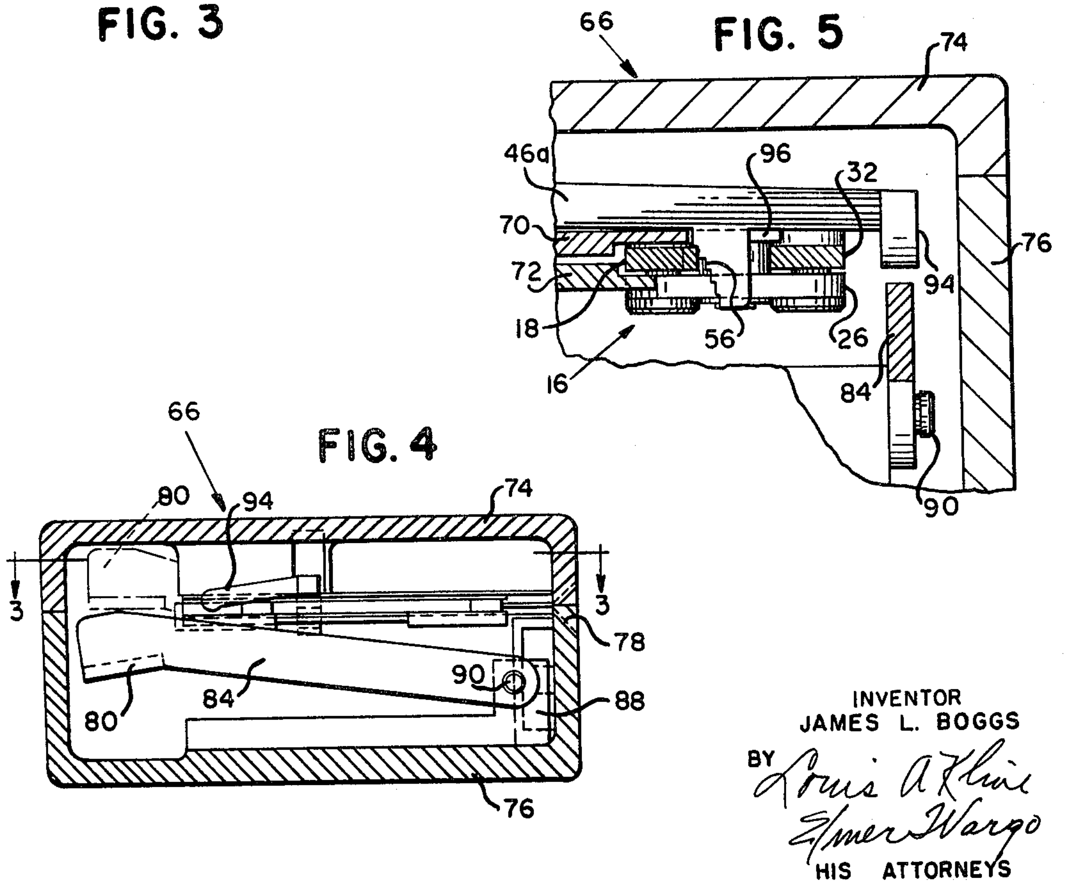
FIG. 4 is a cross-sectional view taken along the line 4—4 of FIG. 3, showing more details of the card reader and throat passage.
FIG. 5 is a cross-sectional view taken along line 5—5 of FIG. 3, showing more details of the stepped abutment stops which are part of the locking means for limiting the motion of the movable wall away from the fixed wall of the throat passage.

FIGS. 3, 4, and 5 show the movable wall 16 used for controlling the width of the throat passage through which punched cards pass in a manually-operated card reader 66. The width of the throat passage is determined by a fixed wall 68, the top of which is shown in FIG. 3, and the movable bar 18 of the movable wall 16. In this embodiment, the movable wall 16 is shown in an inverted position from that shown in FIG. 2, and it is secured to an upper plate 70 (FIG. 5), which is spaced from the lower plate 72 to receive therebetween the thickness of a punched card. These plates 70 and 72 are recessed (FIG. 5) to accommodate the movable wall 16 while still maintaining the necessary spacing to receive the card thickness.

The manually-operated card reader 66 is not a part of this invention; therefore, it will be described only generally and only to that extent necessary to orient the means for adjustably controlling the width of the guideway or throat passage therein in accordance with the card passing therethrough. The housing of the card reader 66 is made of upper and lower halves 74 and 76, respectively, between which the throat passage lies, the opening 78 to the throat passage being shown in FIG. 4. A card to be read is inserted into the opening 78 with one side of the card engaging fixed wall 68 and the other side engaging the curved portion 33 of the bar 18, which is pushed away from the wall 68 to establish the width of the opening according to the width of the card being inserted therein. A spring 37, secured to the plate 70 and the bar 32 (FIG. 3), is used to resiliently urge the bars 18 and 32 toward the fixed wall 68 of the guideway. The bar 18 is maintained parallel to the fixed wall 68 as it is moved towards and away from it by the construction of the movable wall 16 previously described.

The card to be read (not shown) is inserted into the throat passage of the card reader 66 until its leading edge engages the operating handle 80 at the point B, which handle is in the "ready" position, shown in phantom outline in FIG. 4. When so positioned, the card is ready to be read, and the appropriate column of information is aligned at the reading station, whose center line 82 is shown in FIG. 3.

The operating handle 80 is fixed to arms 84 and 86, whose remaining ends are pivotally secured to support blocks 88 by pins 90. The operating handle 80 is yieldably retained in the "ready" position by a spring 92.

When the operating handle 80 is in the "ready" position, shown in phantom outline in FIG. 4, the arm 84 engages the lever 94 to push it towards the upper half 74 of the reader housing. The lever 94 is secured to one end of a locking lever **46*a*, which is similar to the lever 46 shown in FIGS. 1 and 2, and when the lever 94 is pushed upwardly to its utmost position by the operating handle 80, the stepped abutment stops 56 on the locking lever 46*a* are out of engagement with the bar 18, enabling the bar 18 to be moved away from the fixed wall 68 in accordance with the width of the card being inserted in the throat passage. After the card is in position to be read, the operating handle 80 is manually pivoted about the pins 90 in a counter-clockwise direction (as viewed in FIG. 4) to the "read" position, in which the handle 80 is shown in solid outline, and, as can be seen from the figure, the lever 94 (which is U-shaped in cross-section to straddle the arm 84) is out of engagement with the arm 84, enabling the stepped abutment stops 56 to be pushed through a slot 96 in the plate 70 until one of the stops engages the movable bar 18 to restrain its movement away from the fixed wall 68. The locking lever 46*a* is pivotally secured to a bracket 98 by a pin 100. A spring 102 (FIG. 3) urges the locking lever 46*a* clockwise (as viewed in FIG. 5) to bring the pertaining one of the abutment stops 56 carried thereby into engagement with the bar 18**.

The housing of the card reader 66 is provided with a notched-out area 99 (FIG. 3), into which a portion of the leading edge of the card extends when it abuts against the operating handle 80 when said handle is in the "ready" position. When the handle 80 is moved to the "read" position, it is moved out of the way of the card being read, permitting said card to be grasped between the fingers and to be pulled outwardly of the reader. The operating handle is kept in the "read" position by the card passing thereover.

As the card is pulled outwardly of the reader between the fixed wall 68 and the bar 18 (FIG. 3), the information contained therein will be read accurately at the read station (shown by the center line 82). After all the columns of data are sequentially read, the card is pulled completely out of the throat passage, permitting the operating handle 80 to return to the "ready" position, shown in phantom outline in FIG. 4. Upon returning to the "ready" position, the operating handle 80 (via the arm 84) will be effective to pivot the locking lever **46*a* to disengage the abutment stop from the bar 18, enabling the spring 37 to move both bars 18 and 32 in a parallel direction towards the fixed wall 68. When the next card to be read is inserted into the throat passage, the bar 18 will then be moved away from the fixed wall 68** in accordance with the width of the card being inserted therein.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a guideway having a base, and a fixed wall perpendicularly secured thereto, the improvement comprising means for guiding an object parallel to and against said fixed wall and comprising:

a planar member movably mounted on said base for parallel movement towards and away from said fixed wall;

resilient means to urge said planar member towards said fixed wall;

said object, upon entering said guideway, being effective to push said planar member away from said fixed wall against the bias of said resilient means according to the width of said object to thereby establish the width of said guideway;

and locking means effective to prevent a widening of said width of said guideway so established while said object passes through said guideway;

said planar member being one link of a four-link parallel-motion mechanism.

2. The guideway as claimed in claim 1 in which said locking means comprises:

a lever pivotally mounted on said base and movable between first and second positions relative thereto;

said lever having one end with a plurality of abutment stops in stepped relation thereon;

said abutment stops being adapted to engage said planar member and thereby prevent its movement away from said fixed wall when said lever is in said second position;

first means to urge said lever towards said first position, in which said abutment stops are out of engagement with said planar member, permitting said planar member to be moved away from said fixed wall in accordance with the width of said object being guided through said guideway;

and actuating means operatively connected with said lever and adapted to urge said lever to said second position, in which one of said abutment stops engages said planar member to prevent a widening of said width of said guideway.

3. In a manually operated card reader of the type having a throat passage through which the card to be read passes and also having a reading station in said passage to read the data in the card as the card passes said reading station in reading relationship therewith; said passage comprising a pair of parallel plate members spaced apart to receive the thickness of said card therebetween, and an upstanding wall joining said plate members at one lateral edge thereof, the improvement comprising guiding means for guiding said card parallel to said upstanding wall so as to maintain said card in proper registration with said reading station as the card is moved therepast in reading relationship therewith, said guiding means for said card comprising:

a planar bar member movably mounted on one of said plate members for parallel movement towards and away from said upstanding wall to form varying widths of said passage;

resilient means to urge said planar bar member towards said upstanding wall;

said card upon entering said throat passage being effective to push said bar member away from said upstanding wall against the bias of said resilient means to thereby establish the width of said passage according to the width of the card being read;

and locking means effective to provide a fixed stop against which said planar bar member abuts to prevent a widening of said width of said passage so established while the remainder of said card is moved through said throat passage;

said planar bar member being one link of a four-link, parallel-motion mechanism, said planar bar member also being movable in the direction of motion of said card into said throat passage as it is moved away from said upstanding wall;

said locking means having a plurality of stepped abutment stops thereon and also having lever means adapted to bring at least one of said abutment stops into engagement with said planar bar member to provide said fixed stop.

References Cited

UNITED STATES PATENTS

| | | | |
|---|---|---|---|
| 823,849 | 6/1906 | Davidson | 271—59 |
| 1,503,520 | 8/1924 | Stevens | 271—59 |
| 2,226,003 | 12/1940 | Levenhagen | 271—59 |
| 2,986,262 | 5/1961 | Powers | 198—29 |

EDWARD A. SROKA, *Primary Examiner.*